(12) United States Patent
Schunder et al.

(10) Patent No.: US 10,435,126 B2
(45) Date of Patent: Oct. 8, 2019

(54) ELECTRO-HYDRAULIC COMPACT DRIVE FOR ROTATIONAL MOVEMENTS

(71) Applicant: Robert Bosch GmbH, Stuttgart (DE)

(72) Inventors: Johannes Schunder, Lohr am Main (DE); Alexandre Orth, Waldbuettelbrunn (DE); Tor Eivind Jensen, Houston, TX (US); Royce Gerngross, Schijndel (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/553,675

(22) PCT Filed: Feb. 25, 2016

(86) PCT No.: PCT/EP2016/053903
§ 371 (c)(1),
(2) Date: Aug. 25, 2017

(87) PCT Pub. No.: WO2016/139104
PCT Pub. Date: Sep. 9, 2016

(65) Prior Publication Data
US 2018/0050776 A1    Feb. 22, 2018

(30) Foreign Application Priority Data

Mar. 3, 2015  (DE) .......................... 10 2015 203 748

(51) Int. Cl.
*B63G 8/08*  (2006.01)
*F16H 61/42*  (2010.01)
(Continued)

(52) U.S. Cl.
CPC .............. *B63G 8/08* (2013.01); *F16H 39/08* (2013.01); *F16H 61/4192* (2013.01);
(Continued)

(58) Field of Classification Search
None
See application file for complete search history.

(56) References Cited

U.S. PATENT DOCUMENTS

| 3,555,834 A | 1/1971 | Weston, Jr. |
| 3,572,032 A | 3/1971 | Terry |
| (Continued) | | |

FOREIGN PATENT DOCUMENTS

| DE | 29 24 364 A1 | 12/1980 |
| EP | 1 548 289 A1 | 6/2005 |
| GB | 2 181 040 A | 4/1987 |

OTHER PUBLICATIONS

International Search Report corresponding to PCT Application No. PCT/EP2016/053903, dated May 24, 2016 (German and English language document) (8 pages).

*Primary Examiner* — Richard M Camby
(74) *Attorney, Agent, or Firm* — Maginot, Moore & Beck LLP (57) ABSTRACT

An electro-hydraulic compact drive for underwater use and for driving an output element includes a hydraulic motor, a hydraulic pump, and an electric motor as components of the electro-hydraulic compact drive. The hydraulic motor has an output shaft. The hydraulic pump supplies the hydraulic motor with hydraulic fluid via a working line. The hydraulic pump is driven by the electric motor. The components of the electro-hydraulic compact drive are located in a closed container filled with a hydraulic fluid. The container has an opening for coupling the output shaft of the hydraulic motor to the output element. The electro-hydraulic compact drive forms a closed unit that contains the complete electric motor/hydraulic pump/hydraulic motor arrangement. The compact drive combines the advantages of the high power density of hydraulics with a decentralized electric direct drive. The handling of the drive is simplified, thus also (Continued)

simplifying the control of underwater vehicles and machines.

19 Claims, 4 Drawing Sheets

(51) Int. Cl.
*F16H 39/08* (2006.01)
*F16H 61/4192* (2010.01)
*B63G 8/00* (2006.01)

(52) U.S. Cl.
CPC .............. *F16H 61/42* (2013.01); *B63G 8/001* (2013.01); *B63G 2008/004* (2013.01); *B63G 2008/005* (2013.01)

(56) References Cited

U.S. PATENT DOCUMENTS

| | | | | |
|---|---|---|---|---|
| 3,838,654 A | * | 10/1974 | Haas | B63G 8/08 114/338 |
| 3,907,120 A | | 9/1975 | Johnston et al. | |
| 2012/0189472 A1 | * | 7/2012 | McDonald | B63G 8/001 417/372 |

* cited by examiner

ELECTRO-HYDRAULIC COMPACT DRIVE FOR ROTATIONAL MOVEMENTS

This application is a 35 U.S.C. § 371 National Stage Application of PCT/EP2016/053903, filed on Feb. 25, 2016, which claims the benefit of priority to Serial No. DE 10 2015 203 748.7, filed on Mar. 3, 2015 in Germany, the disclosures of which are incorporated herein by reference in their entirety.

BACKGROUND

The disclosure concerns a compact electrohydraulic drive, which is especially but not only for use under water and for the rotational driving of an output element, such as a propeller, a wheel, or a cable winch. For this, the compact unit comprises as its components a hydraulic motor, having an output shaft, a hydraulic pump, by which the hydraulic motor can be supplied with a hydraulic fluid by a working line, and an electric motor, by which the hydraulic pump can be driven.

For many activities under water in connection with the extraction of fossil fuels such as oil and gas, the mining of mineral resources, the natural sciences, robotics with the aid of remote operated vehicles (ROV) or automated underwater vehicles (AUV), infrastructure programs, or renewable energy, special machines and equipment with underwater systems are required, which can be driven and controlled in the harsh environment.

Many underwater devices need to be outfitted with a controllable drive system or several controllable drive systems, also known as thrusters. Usually these thrusters have a propeller as their output element. In particular, underwater robots such as ROVs or AUVs require a thruster or several thrusters, for example eight thrusters, in order to make possible the needed mobility of the robot in all six degrees of freedom.

The output element need not be a propeller. Instead, a wheel can also be the output element, which stands on the sea bottom or is used to drive a chain, such as is the case with an underwater mining vehicle. Furthermore, the compact drive can also drive a cable winch, used for positioning of ships or underwater devices. Examples which may be mentioned are mooring, laying anchors, compensating for wave action, or stretching a chain under water.

Devices designed especially for operation under water must function safely and reliably. The customary solution is to employ hydraulic motors to drive output elements, which can be supplied with hydraulic fluid with a collective hydraulic pump across electrically actuated underwater valves. Such a device is known from GB 2 181 040 A. If the pump fails, the underwater robot or the underwater device can no longer move and must be hauled to the surface at once for repairs.

In order to compensate for the movements and currents of the water, an underwater drive furthermore requires a dynamic control system. At the same time, the drive should work with minimal energy consumption at all times. These two requirements of high dynamics and energy efficiency are hard to achieve with the systems mentioned above. Furthermore, the requirements on functional safety become greater, so as to be able to work safely even under complex conditions of application. For example, one may mention here for functional safety a safely reduced speed when approaching an object.

An electrohydraulic drive which is designed for use under water and in which a hydraulic pump driven by an electric motor and a hydraulic motor are interconnected in a closed hydraulic circuit is known from DE 29 24 364 A1. The hydraulic motor drives a propeller, constituting the output element. A total of three electrohydraulic drives of the mentioned kind are disposed on a piece of mining equipment and serve for the moving of the device under water or the moving of parts of the device relative to a device frame.

The problem which the disclosure proposes to solve is to modify an electrohydraulic drive which is provided for use under water and which comprises as its components a hydraulic motor, having an output shaft, a hydraulic pump, by which the hydraulic motor can be supplied with a hydraulic fluid by a working line, and an electric motor, by which the hydraulic pump can be driven, so that it is especially suitable for use under water.

This problem is solved by a compact electrohydraulic drive in which the components are present in a closed container filled with hydraulic fluid and the container has an opening for coupling of the output shaft of the hydraulic motor with the output element. Thus, according to the disclosure, the compact electrohydraulic drive forms a self-enclosed unit, which houses the entire electric motor, hydraulic pump, and hydraulic motor layout. The compact drive combines the benefits of the high power density of the hydraulics with a decentralized direct electric drive. High reliability and safety are achieved. The handling of the drive is easier. The electric motor, which is coupled to the hydrostatic transmission formed by the hydraulic pump and the hydraulic motor, can be a small, light and compact electric motor running at high rotary speed. Advantageously, the electric motor has variable rotary speed control.

In order to achieve especially high dynamics of the drive, the hydraulic pump is advantageously adjustable in its stroke volume. Preferably, the hydraulic motor is also adjustable in its stroke volume, so that the dynamics and the energy efficiency of the electrohydraulic drive are further enhanced.

Advisedly, an electrical control system for the power supply of the electric motor is arranged in the container. Advantageously, the electrical control system is outfitted with computing capacity and is programmed with algorithms for the operation of the components, or is suitable to being programmed with algorithms for the operation of the components.

It is advantageous if the hydraulic motor can also be operated as a hydraulic pump, the hydraulic pump can also be operated as a hydraulic motor, and the electric motor driven by the hydraulic pump working as a hydraulic motor can also be operated as a generator. Then electrical energy can be recovered, driven by a propeller or a wheel, and stored for later consumption in a battery. For this, algorithms for the recovery and storage of energy are integrated in the electrical control system.

The compact drive may contain an electronic control module with built-in functionality for a dynamic positioning control of a vehicle which is outfitted with the drive. The control module can be an integral module of the electronic vehicle control system.

Preferably sensors are integrated in the compact electrohydraulic drive, especially sensors such as sensors for the pressure in the hydraulic circuit, for the rotary speed, for the position, for the velocity, for the acceleration, for the temperature and for the condition, for example, for the degree of contamination of the hydraulic fluid and for the water depth, especially microelectromechanical sensors (MEMS). By monitoring the temperature, one can avoid the drive from failing when operating in an environment with extreme temperatures, such as may prevail above the surface of the water. With sensors, the stroke volume of the hydraulic units can be detected. Likewise, with sensors the rotary speed of the components can be detected for an especially good control capability. An algorithm can be implemented with which the output torque of the hydraulic motor is limited, so as to avoid damaging the output element, especially a propeller. Likewise, an algorithm can be implemented with which the pressure in the hydraulic circuit is increased in order to free the propeller from an object which has gotten caught in it.

Regulating functions may be integrated for the automatic compensation for external disturbances such as, e.g., water currents or opposing forces when activating an actuator. For example, sensors are used to measure the accelerations on the drives. The propellers are then operated so that the forces along the axis of orientation of the propeller are reduced as much as possible by generating opposing forces of equal strength. Likewise, algorithms can be integrated for condition monitoring, such as, for example, a counting of operating time or a monitoring of torque and vibration. Algorithms can be integrated for maximizing the dynamics and the efficiency.

A compact electrohydraulic drive according to the disclosure advantageously has at least one communications interface for exchanging data with or without cable.

Safety functions can be integrated in the electronic control system as closed regulation circuits.

In particular, the following safety functions are conceivable:

a) Safe torque off (STO): when the electrical control system receives an emergency off command via the communications interface, the electric motor and thus also the hydraulic pump and the hydraulic motor are switched off (without power). The propeller will stop after an uncontrolled time and an uncontrolled path.

b) Safe stop 1 and 2 (SS1 and SS2): when the electrical control system receives a particular command (such as SS1 or SS2 messages) via the communications interface, the electric motor and thus also the hydraulic pump and the hydraulic motor are actuated so that the propeller is halted after a controlled maximum time and a controlled maximum path.

c) Safe maximum speed (SMS), safe limited speed (SLS): The electrical control system regulates the rotary speed of the propeller with corresponding sensors (such as encoders) so that the rotary speed does not exceed the maximum value dictated by the communications interface. If this value is exceeded, the electric motor will be switched off. Besides the maximum rotary speed, the control system can regulate a temporary reduced velocity, for example to make possible a certain sensitive movement. This function enables, for example, a close approach to an object.

d) Safe direction (SDI): when the electrical control system receives a command via the communications interface to move safely in a particular direction, this rotary movement of the propeller is monitored by means of a sensor. If the wrong direction of rotation is indicated, the electric motor is switched off, for example in order to move out from a dangerous area.

e) Safe maximum torque (SMT): the torque of the propeller is regulated by a corresponding sensor or corresponding sensors (for example, a pressure sensor and a stroke volume sensor). If the torque exceeds the maximum predetermined value, the electric motor is switched off.

f) Safe stopping system in the orientation of the propeller axis: the external forces acting on the drive are measured with an acceleration sensor and the electric motor is actuated so that an opposing force is generated, so as to maintain the position in this way. If the acceleration nevertheless exceeds the predetermined value, another safety function is activated, for example, "safe direction of rotation" or "safe disconnected torque". By arranging several differently oriented compact drives on an underwater robot (such as AUV or ROV), the position of the robot in several directions can be controlled and maintained by the combination of this function.

g) Safe communication (SCO): the transmission of safety-relevant data, such as commands or parameters via the communications interface, is monitored with corresponding fault recognition methods. If a fault is recognized, the electrical control system initiates a safety function, such as "safe disconnected torque".

The compact electrohydraulic drive can have at least one interface by which hydraulic fluid can be replenished or replaced under water.

Advantageously, electrical and mechanical interfaces of a compact electrohydraulic drive according to the disclosure can be decoupled under water. This makes it possible to replace a compact drive with the help of a diver or a robot (remotely operated vehicle or autonomous underwater vehicle).

Advisedly, the compact electrohydraulic drive has a filter or several hydraulic filters with or without status sensors, for example in order to prevent excessive contamination of the hydraulic fluid with water or particles. The status sensors can indicate whether a replacement of the hydraulic fluid is necessary.

For use at greater depths, the container of a compact electrohydraulic drive has a movable compensation piston, which bounds the interior space of the container by a first surface and is subjected to the ambient pressure at a second surface, which is just as large as the first surface and oriented opposite to it. If, for example, an additional force is exerted on the compensation piston by a spring in the direction of the interior space of the container, the pressure in the container will always be somewhat higher than on the outside, so that no water can get in. By monitoring the position of the compensation piston, one can identify a leakage of hydraulic fluid to the outside.

A set of at least two compact electrohydraulic drives according to the disclosure can be arranged on a device to be moved, wherein the movement of the device is realized by operating of the compact electrohydraulic units in coordination with each other, with or without an overarching control system.

If a vehicle is outfitted with several compact electrohydraulic drives according to the disclosure, i.e., a set of compact electrohydraulic drives according to the disclosure, it is possible by an intelligent algorithm or regulation circuit to compensate as much as possible for the failure of one compact unit by the operation of the other compact units.

BRIEF DESCRIPTION OF THE DRAWINGS

A sample embodiment of a compact electrohydraulic drive according to the disclosure, a set of eight compact electrohydraulic drives according to the disclosure, and various output possibilities are presented in the drawings. The disclosure shall now be explained more closely with the aid of the figures of these drawings.

There are shown.

DETAILED DESCRIPTION

Figure 1:
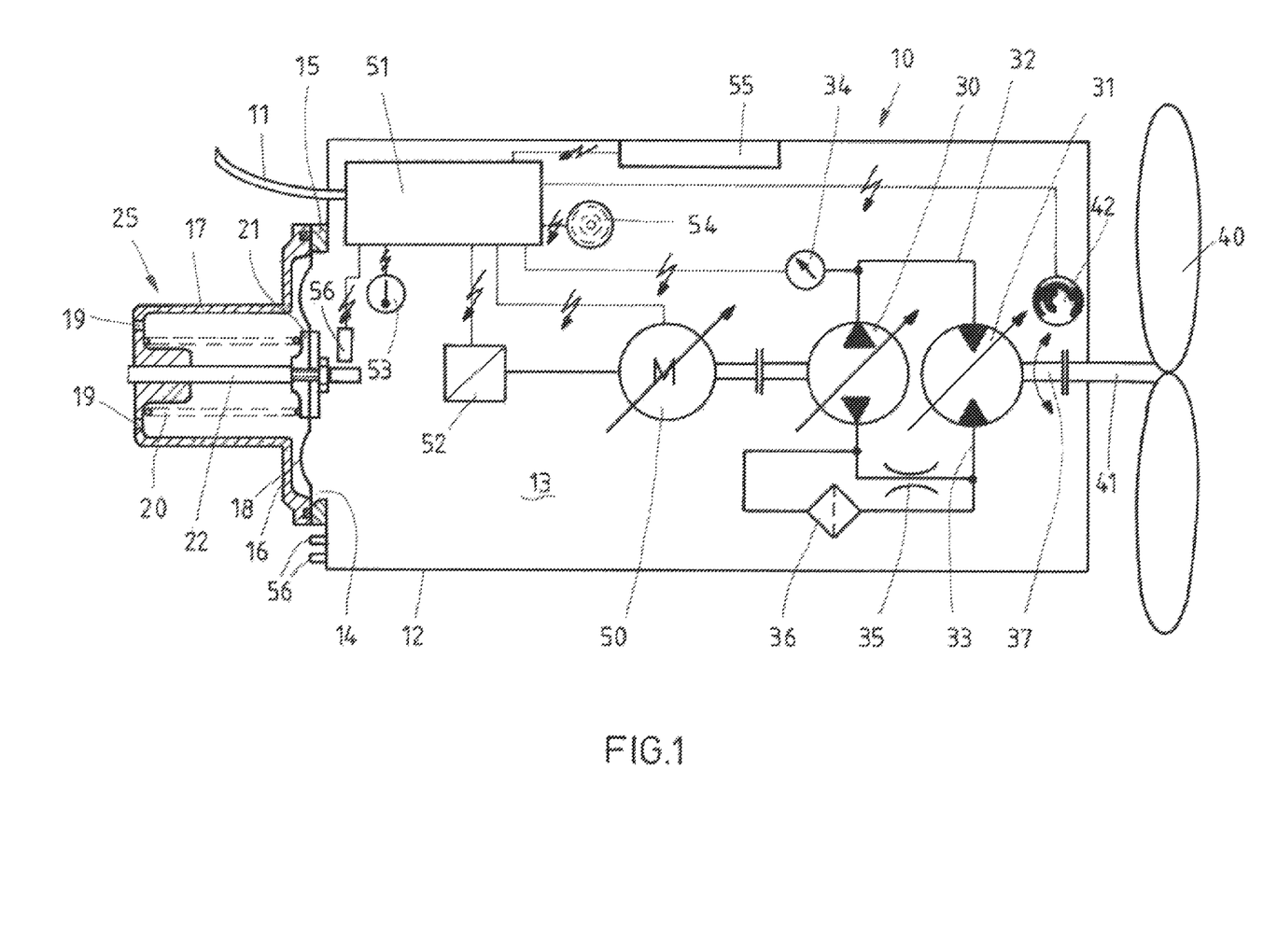
FIG. 1, the sample embodiment as a drive for a propeller.

From the compact electrohydraulic drive 10 in FIG. 1, only one electrical cable 11 leads to the sea surface or another overarching electrical control system situated under water. The compact electrohydraulic drive comprises a container 12 with an interior space 1 closed off from the surroundings, being filled with a hydraulic fluid as a working medium.

The container is pressure-compensated by a compensation device 25 against the surrounding pressure prevailing under water. For this, a cover 17 is fastened to a flat edge 15 with a flange 16, surrounding an opening 14 in the container wall, and a membrane 18 is tightly clamped between the flat edge 15 and the cover 17. Holes 19 are located in the cover 17, so that the space between membrane and cover is part of the surroundings and is filled with seawater. Thus, thanks to the membrane 18, the interior space 13 is sealed off from the surroundings. The membrane is subjected at its first surface, facing the interior space, to the pressure in the interior space and at its second surface, facing the cover 17 and having exactly the same size as the first surface, to the pressure prevailing in the surroundings, and it always seeks to take up a position and shape in which the sum of all forces acting on it is zero. In order for the pressure in the interior space 13 to be slightly higher than the surrounding pressure, the membrane 18 in addition to the surrounding pressure is stressed against the interior pressure by a spring 20, which is installed between a shape-stable central membrane plate 21 and the cover 17. The force of the spring 20 is chosen such, in consideration of the size of the pressurized surfaces of the membrane, that the pressure in the interior space is for example between 0.5 bar and 2 bar higher than the surrounding pressure. The membrane plate 21 is attached to a rod 22, which is led through the cover 17, which may be provided with a measuring scale and be part of a transmitter which detects the position of the center of the membrane 18. According to the sample embodiment, the rod 22 protrudes beyond the membrane plate 21 into the interior space 13 of the container 12 and is provided there with a measuring scale. A position sensor 56 detects the position of the rod 22 and thus the membrane 18 and sends a corresponding signal to the electrical control unit 51. Contact of the measuring scale and the position sensor 56 with seawater is then avoided and the reliability is increased.

All mechanical, electrical and hydraulic components which are necessary or beneficial for the control of the compact electrohydraulic drive 10 are accommodated in the interior space 13 of the container 12 except for the source of the electrical power energy and overarching electrical control signals.

The interior space 13 of the container 12 contains a hydraulic pump 30 and a hydraulic motor 31, which are joined together by two working lines 32 and 33 and arranged together in a closed hydraulic circuit. Both the hydraulic pump 30 and the hydraulic motor 31 are adjustable in their stroke volume. While the hydraulic motor is adjustable between a maximum value and a stroke volume of zero or near zero, the hydraulic pump 30 is always driven in the same direction and is adjustable in its stroke volume between a maximum positive value and a maximum negative value. Accordingly, the working line 32 is a high-pressure line and the working line 33 is a low-pressure line, or vice versa, depending on the direction in which the hydraulic pump is moved from a neutral position or zero position. Thus, by moving the hydraulic pump through zero while maintaining the direction of rotation of electric motor and hydraulic pump, the direction of rotation of the hydraulic motor can be reversed. The pressure prevailing in the working line 32 is detected by a pressure sensor 34. Accordingly, the pressure prevailing in the working line 33 can also be detected by a pressure sensor. In the working line 33 there is a throttle 35, which is connected in parallel with a device 36 for the separating of water contained in the hydraulic fluid, which is usually an oil. Thanks to the throttle 35, a portion of the hydraulic fluid flowing back from the hydraulic motor 31 to the hydraulic pump 30 flows across the separation device 36, so that a portion of the returning oil is always cleaned. The device 36 can also be combined with a filter for cleaning solid particles from the hydraulic fluid.

The hydraulic motor 31 has an output shaft 37 which is coupled in rotationally firm manner to a propeller 40 located outside the container 13, forming the output element of the electrohydraulic drive. A central drive shaft 41 of the propeller is led tightly through a wall of the container 13 and connected on the inside to the output shaft 37 of the hydraulic motor 31. The rotary speed of the output shaft of the hydraulic motor and the drive shaft of the propeller is detected by a rotary speed sensor 42 arranged inside the container.

The hydraulic pump 30 is driven by an electric motor 50, which is regulable in its rotary speed and for this purpose is connected to an electrical control unit 51, which is likewise accommodated in the interior space 13 and connected by the cable 11, led out in sealed manner from the container 12 to an electrical power source on the sea surface and possibly also to an overarching electrical control system arranged under water. The rotary speed of the electric motor 50 and the hydraulic pump 30 is detected by a rotary speed encoder 52 and processed by the control unit 51.

Besides the sensors already mentioned, there is also a temperature sensor 53 for detecting the temperature of the hydraulic fluid located in the container and an acceleration sensor 54 for detecting accelerations of the compact drive.

The electric motor 50 can also be operated as a generator, the hydraulic pump 30 also as a hydraulic motor, and the hydraulic motor 31 also as a hydraulic pump, which driven by the propeller acts as a pump to supply hydraulic fluid to the pump 30, acting as a hydraulic motor. In turn, the electric motor 50 can be driven as a generator by the pump 30, working as a hydraulic motor. In this way, electrical energy can be recovered from a rotary motion of the propeller and be stored for example in a battery.

The compact drive further contains an electronic control module 55, which is a component of a control system with which a vehicle having the compact drive is steered, and having a built-in functionality for a dynamic position control of the vehicle. Modifications of an electrohydraulic system according to the disclosure which are different from the sample embodiment shown are also possible.

The container has two one interfaces 56, which serve to replenish or replace hydraulic fluid under water.

The electrical control system in its simplest form comprises a d.c. motor, an electrical controller with corresponding analog and digital input and output interfaces, as well as a suitable power supply.

The electrical control system in an advanced form comprises a rotary current motor with corresponding drive and frequency converter, an electrical controller with corresponding analog and digital input and output interfaces, as well as a suitable power supply and network interfaces, both LAN, bus systems, and fiber optic cable or wireless LAN.

The electrical cable comprises, besides the power supply, also the electrical signals for the control communication, such as, for example, nominal values, actual values, and fault messages.

A condition monitoring of the electrohydraulic system can be implemented in the electrical control system by evaluating all sensor signals with corresponding algorithms, implemented in the form of software. In the event of a fault, the control system can by itself bring the compact drive to a safe resting condition and inform the overarching control system of this. For this, preventive and reactive maintenance steps can be communicated to the overarching control system.

Figure 2:
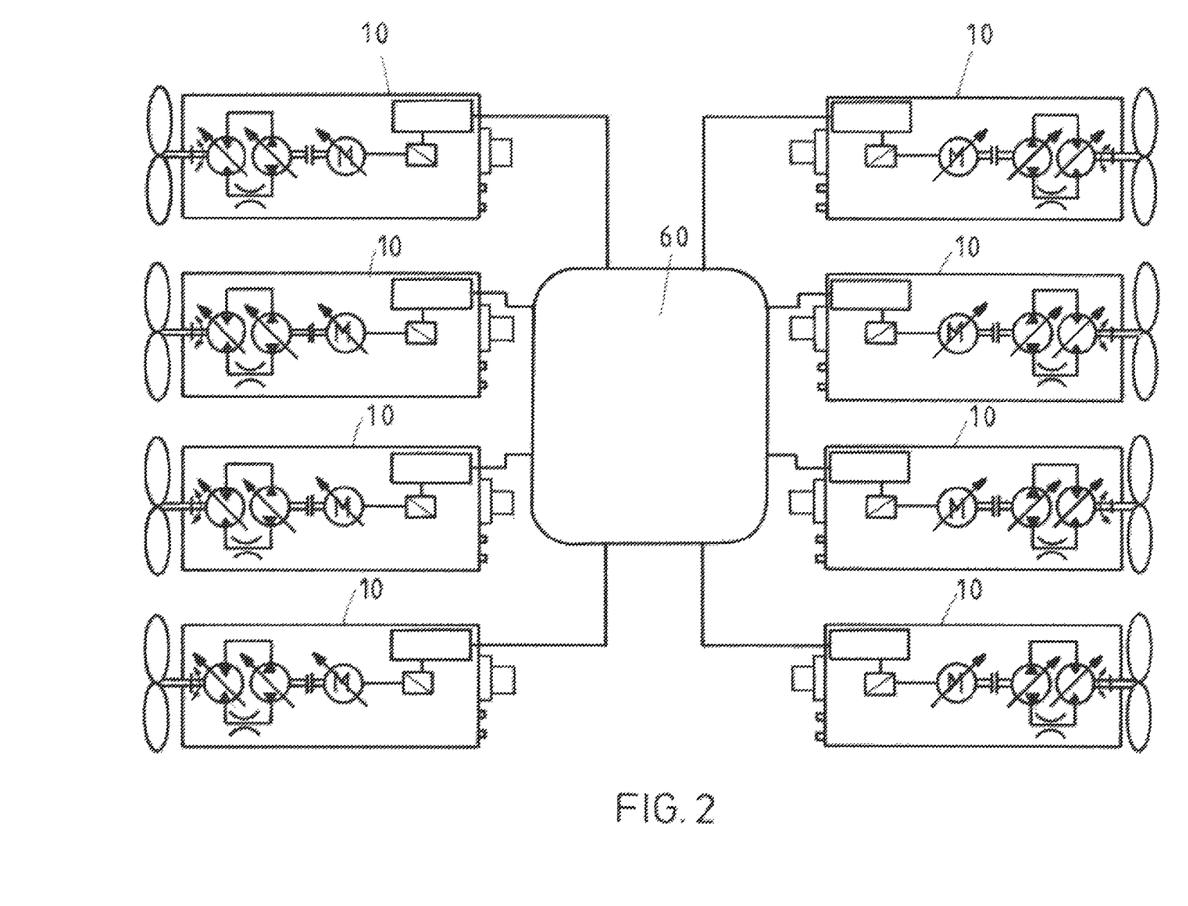
FIG. 2, a set of eight compact electrohydraulic drives according to the disclosure, FIGS. 3*a* to 3*d*, various output possibilities, and FIG. 4, the sample embodiment as a drive for a cable winch.

FIG. 2 shows a set of eight compact electrohydraulic drives 10 according to the disclosure, each of which is designed as the compact electrohydraulic drive of FIG. 1 and all of them being located on the same underwater vehicle. The electrical control systems 51 of the compact drives are connected to a central master control system 60, which actuates the individual compact drives according to the movement pattern specified for the vehicle. Two of the compact drives are responsible for opposite movements of the vehicle along an x axis. Another two compact drives are responsible for opposite movements of the vehicle along a y axis. Another compact drive is responsible for a movement of the vehicle in the direction of a z axis, it being assumed that a movement in the one direction of the z axis occurs by virtue of gravity. Of the other three compact drives, one is responsible for rotations about the x axis, one for rotations about the y axis, and one for rotations about the z axis.

In event of failure of one or more of the compact electrohydraulic drives 10 shown in FIG. 2, the failure is compensated as much as possible by an intelligent algorithm or regulating circuit, so that essential movement programs are still carried out in the emergency.

Figure 3:
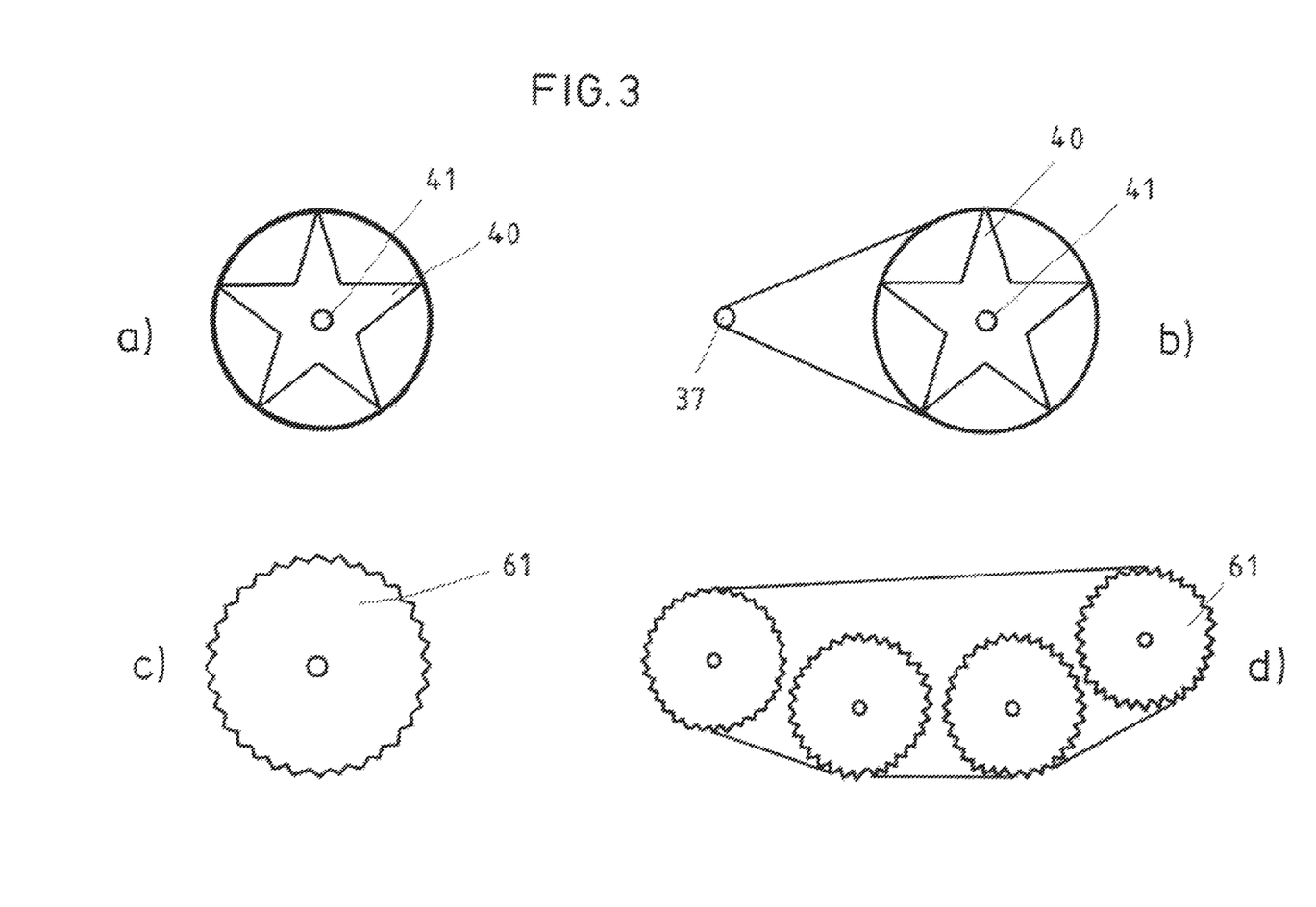

Of the four output possibilities shown in FIG. 3, the one of FIG. 3a corresponds to those shown in FIGS. 1 and 2. A propeller 40 is driven across a central drive shaft 41 directly by a hydraulic motor.

FIG. 3b shows a propeller 40, whose central drive shaft 41 is arranged parallel to the output shaft 37 of a hydraulic motor, but at a spacing from the shaft 37. The output shaft of the hydraulic motor and the drive shaft of the propeller are coupled together across a traction drive.

According to the embodiment of FIG. 3c, a single wheel 61 can also be driven directly by the hydraulic motor of a compact electrohydraulic drive according to the disclosure. The wheel per FIG. 3d can be part of a caterpillar track.

Figure 4:
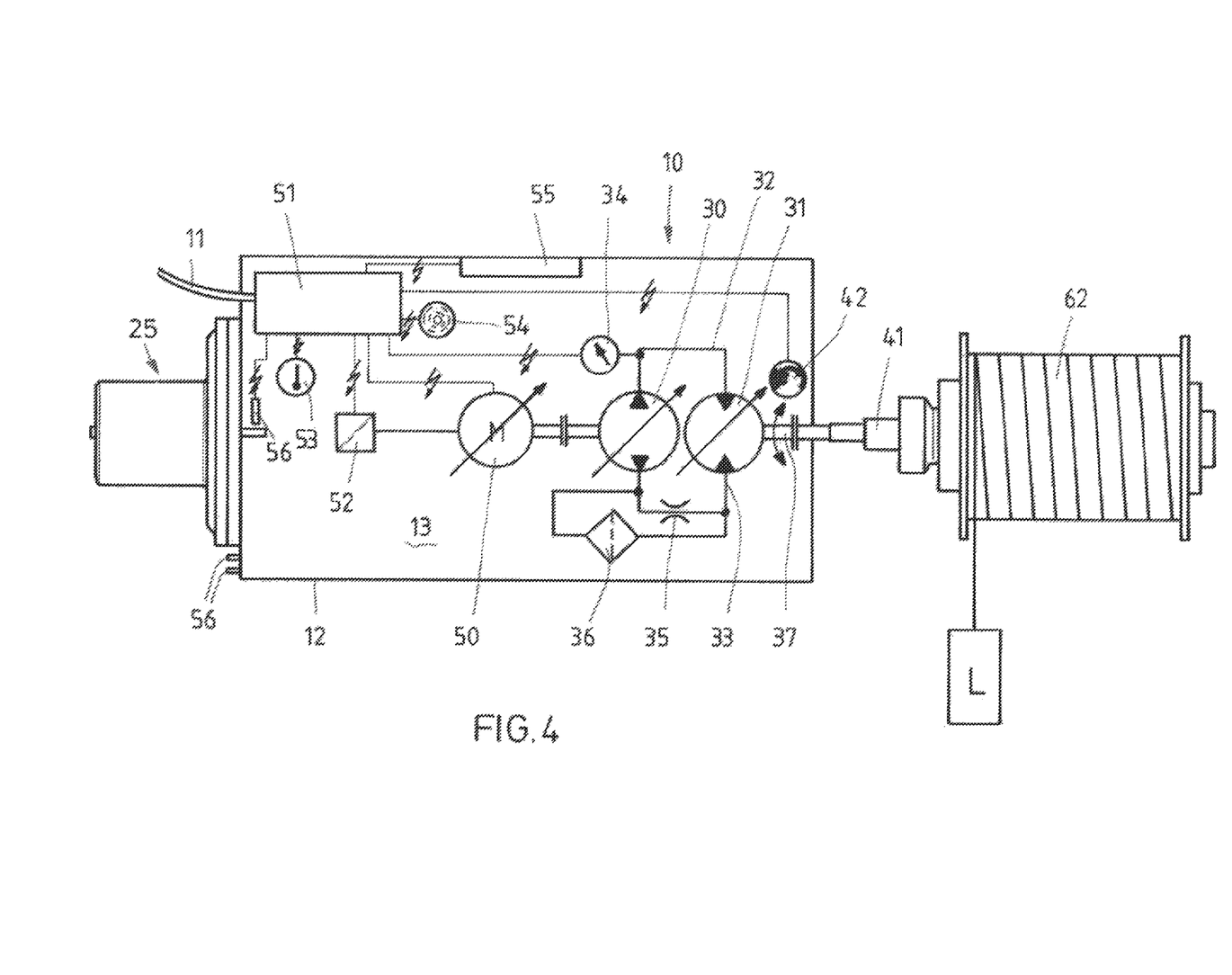

FIG. 4 shows a cable winch 62, which is driven directly by the hydraulic motor 31 across a central drive shaft 41. Typical regulating algorithms for the actuation of a cable winch are then implemented in the electrical control unit, for example, in order to regulate the position of a ship or an underwater machine or to move an actuator or to raise and lower a load. Cable winches are used aboard ships for many applications. For many applications it is advisable to implement algorithms for compensation of wave action (heave compensation system).

In summary, a compact electrohydraulic drive according to the disclosure is thus created with low overall operating costs, having high energy efficiency, high reliability and high safety level, being maintenance friendly and providing high performance. Thanks to the compact design, a reduction in weight of the overall drive system as compared to a detached design is achieved.

A compact drive according to the disclosure is therefore especially suitable for use aboard modern vehicles and machines for deep water application, such as, for example, underwater robots ROVs and AUVs or underwater machinery, such as that for extraction of raw materials, which are thus easier to realize technically and economically.

LIST OF REFERENCE NUMBERS 10 compact drive
11 electrical cable
12 container
13 interior space of 12
14 opening
15 flat edge of 12
16 flange
17 cover
18 membrane
19 holes in 17
20 spring
21 membrane plate
22 rod with measuring scale
25 pressure-compensation device
30 hydraulic pump
31 hydraulic motor
32 working line
33 working line
34 pressure sensor
35 throttle
36 separation device
37 output shaft of 31
40 propeller
41 drive shaft
42 rotary speed sensor
50 electric motor
51 electrical control unit
52 rotary speed encoder
53 temperature sensor
54 acceleration sensor
55 electronic control module
56 position sensor
60 electrical control system
61 wheel
62 cable winch

The invention claimed is:

1. A compact electrohydraulic drive for use under water and for the driving of an output element, comprising:
    a hydraulic motor having an output shaft;
    a hydraulic pump configured to supply the hydraulic motor with a hydraulic fluid via a working line; and
    an electric motor configured to drive the hydraulic pump,
    wherein the hydraulic motor, the hydraulic pump, and the electric motor are disposed in a closed container filled with hydraulic fluid, the container having an opening for coupling of the output shaft of the hydraulic motor to the output element, and
    wherein an electrical control system for the power supply of the electric motor has computing capacity and is configured to be programmed with algorithms for the operation of the hydraulic motor, the hydraulic pump, and the electric motor.

2. The compact electrohydraulic drive as claimed in claim 1, wherein the electric motor has variable rotary speed control.

3. The compact electrohydraulic drive as claimed in claim 1, further comprising:
an electrical control system for the power supply of the electric motor arranged in the container.

4. The compact electrohydraulic drive as claimed in claim 3, wherein:
the hydraulic motor is configured to be operated as a hydraulic pump,
the hydraulic pump is configured to be operated as a hydraulic motor,
the electric motor driven by the hydraulic pump working as a hydraulic motor is configured to be operated as a generator, and
algorithms for the recovery and storage of energy are integrated in the electrical control system.

5. The compact electrohydraulic drive as claimed in claim 1, wherein the hydraulic pump has an adjustable stroke volume.

6. The compact electrohydraulic drive as claimed in claim 1, wherein the hydraulic motor has an adjustable stroke volume.

7. The compact electrohydraulic drive as claimed in claim 1, further comprising:
integrated sensors.

8. The compact electrohydraulic drive as claimed in claim 1, wherein regulating functions are integrated for the automatic compensation for external disturbances when activating an actuator.

9. The compact electrohydraulic drive as claimed in claim 1, further comprising:
at least one communications interface configured to exchange data with or without cable.

10. The compact electrohydraulic drive as claimed in claim 1, wherein safety functions are integrated as closed regulation circuits.

11. The compact electrohydraulic drive as claimed in claim 1, wherein algorithms for condition monitoring are integrated.

12. The compact electrohydraulic drive as claimed in claim 1, wherein algorithms for regulating a cable winch are integrated.

13. The compact electrohydraulic drive as claimed in claim 1, further comprising:
at least one interface by which hydraulic fluid is configured to be replenished or replaced under water.

14. The compact electrohydraulic drive as claimed in claim 1, wherein electrical and mechanical interfaces of the compact electrohydraulic drive are configured to be decoupled under water.

15. The compact electrohydraulic drive as claimed in claim 1, further comprising:
one or more of a hydraulic filter and a device configured to separate contaminations of the hydraulic fluid with water and dirt particles with or without status sensors.

16. The compact electrohydraulic drive as claimed in claim 1, wherein the container has a movable compensation piston that bounds the interior space of the container by a first surface and that is subjected to the ambient pressure at a second surface, the second surface being just as large as the first surface and oriented opposite to the first surface.

17. A set of at least two compact electrohydraulic drives, the compact electrohydraulic drives each comprising:
a hydraulic motor having an output shaft,
a hydraulic pump configured to supply the hydraulic motor with a hydraulic fluid via a working line, and
an electric motor configured to drive the hydraulic pump,
wherein the hydraulic motor, the hydraulic pump, and the electric motor are disposed in a closed container filled with hydraulic fluid, the container having an opening for coupling of the output shaft of the hydraulic motor to the output element,
wherein the compact electrohydraulic drives are arranged on a device configured to be moved,
wherein the device is moved by operating the compact electrohydraulic drives in coordination with each other, with or without an overarching control system, and
wherein an intelligent algorithm or regulation circuit compensates as much as possible for the failure of one compact drive by the operation of the other compact drives.

18. A compact electrohydraulic drive for use under water and for the driving of an output element, comprising:
a hydraulic motor having an output shaft;
a hydraulic pump configured to supply the hydraulic motor with a hydraulic fluid via a working line;
an electric motor configured to drive the hydraulic pump; and
integrated sensors,
wherein the hydraulic motor, the hydraulic pump, and the electric motor are disposed in a closed container filled with hydraulic fluid, the container having an opening for coupling of the output shaft of the hydraulic motor to the output element, and
wherein the integrated sensors are microelectromechanical sensors (MEMS) configured to sense one or more of pressure, rotary speed and position, velocity and acceleration, temperature, and water depth.

19. A compact electrohydraulic drive for use under water and for the driving of an output element, comprising:
a hydraulic motor having an output shaft;
a hydraulic pump configured to supply the hydraulic motor with a hydraulic fluid via a working line;
an electric motor configured to drive the hydraulic pump; and
at least one communications interface configured to exchange data with or without cable,
wherein the hydraulic motor, the hydraulic pump, and the electric motor are disposed in a closed container filled with hydraulic fluid, the container having an opening for coupling of the output shaft of the hydraulic motor to the output element.

* * * * *